US008892493B2

(12) United States Patent
Aull et al.

(10) Patent No.: US 8,892,493 B2
(45) Date of Patent: Nov. 18, 2014

(54) COMPATIBILITY TESTING USING TRACES, LINEAR TEMPORAL RULES, AND BEHAVIORAL MODELS

(75) Inventors: Randall Edward Aull, Kenmore, WA (US); Pankaj Bharti Gupta, Bothell, WA (US); Robert Eugene Harris, Jr., Woodinville, WA (US); Jane Evguenia Lawrence, Redmond, WA (US); Venkatesh-Prasad Ranganath, Karnataka (IN); Pradip Harindran Vallathol, Kerala (IN)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 13/364,215

(22) Filed: Feb. 1, 2012

(65) Prior Publication Data
US 2012/0159250 A1    Jun. 21, 2012

Related U.S. Application Data

(63) Continuation-in-part of application No. 12/972,273, filed on Dec. 17, 2010, now Pat. No. 8,538,909.

(51) Int. Cl.
*G06N 5/02* (2006.01)
*G06F 17/00* (2006.01)
*G06F 11/36* (2006.01)
*G06F 11/22* (2006.01)
*G06F 11/34* (2006.01)

(52) U.S. Cl.
CPC ........ *G06F 11/2247* (2013.01); *G06F 11/3672* (2013.01); *G06F 11/3476* (2013.01)
USPC ............. 706/47; 706/58; 714/14; 714/E11.02

(58) Field of Classification Search
None
See application file for complete search history.

(56) References Cited

U.S. PATENT DOCUMENTS 5,373,486 A    12/1994  Dowla et al.
6,944,848 B2    9/2005  Hartman et al.
(Continued)

FOREIGN PATENT DOCUMENTS

WO        2004028131 A1    1/2004

OTHER PUBLICATIONS

Gabel, Su, "Javert: Fully Automatic Mining of General Temporal Properties from Dynamic Traces", Proceeding SIGSOFT '08/FSE-16 Proceedings of the 16th ACM SIGSOFT International Symposium on Foundations of software engineering, 2008, pp. 339-349.*

(Continued)

*Primary Examiner* — Kakali Chaki
*Assistant Examiner* — Walter Hanchak
(74) *Attorney, Agent, or Firm* — Dan Choi; Judy Yee; Micky Minhas

(57) ABSTRACT

A "Compatibility Tester" extracts observable behaviors from different system implementations (e.g., software, operating systems, device drivers, hardware interfaces, etc.), then performs compatibility testing via comparisons of the extracted behaviors. Traces (e.g., bus level signals between controllers and hardware devices or commands between software components) representing observable behaviors of different implementations of a system are captured. Temporal and structural rules are then mined from these traces. The mined rules (or a model constructed from those rules) are used by a "Rule Checking" process that determines whether reference rules (mined from a known compatible system) are compatible with rules mined from test traces of a second system. Invalid rules are flagged as behavioral compatibility bugs. Alternately, the mined rules are used by a "Rule Diffing" process that performs set differencing of the behavioral and structural rules mined from the different system implementations, with differences between the systems flagged as behavioral compatibility bugs.

20 Claims, 4 Drawing Sheets

(56) References Cited

U.S. PATENT DOCUMENTS

| | | | |
|---|---|---|---|
| 7,251,584 | B1 | 7/2007 | Perazolo et al. |
| 7,509,298 | B2 | 3/2009 | Chandra et al. |
| 7,577,963 | B2 | 8/2009 | O'Farrell et al. |
| 7,594,219 | B2 | 9/2009 | Ramachandran et al. |
| 7,941,616 | B2 | 5/2011 | Rajamani et al. |
| 8,280,899 | B2 | 10/2012 | Lo et al. |
| 2004/0024773 | A1 | 2/2004 | Stoffel et al. |
| 2004/0153288 | A1 | 8/2004 | Tovinkere et al. |
| 2011/0087700 | A1 | 4/2011 | Lo et al. |
| 2012/0159263 | A1* | 6/2012 | Ranganath et al. ............ 714/45 |

OTHER PUBLICATIONS

Hill, "Context-based Analysis of System Execution Traces for Validating Distributed Real-time and Embedded System Quality -of-Service Properties", Embedded and Real-Time Computing Systems and Applications (RTCSA), 2010 IEEE 16th International Conference on, Aug. 23-25, 2010, pp. 92-101.*

Olszewski, "Doctoral Dissertation Generalized feature extraction for structural pattern recognition in time-series data" phD Thesis from Carnegie Mellon University Pittsburgh, PA, USA © 2001, pp. 1-111.*

Yoon, Sussman, Memon, Porter, "Direct-Dependency-based Software Compatibility Testing", Proceeding ASE '07 Proceedings of the twenty-second IEEE/ACM international conference on Automated software engineering, 2007, pp. 409-412.*

Lo, Mariani, Pezze, "Automatic Steering of Behavior Model Inference", Joint Meeting of the European Software Engineering Conference and the ACM SIGSOFT Symposium on the Foundations of Software Engineering (ESEC-FSE)., 2009, pp. 345-354.*

Lo, Khoo, Liu, "Efficient Mining of Iterative Patterns for Software Specific Discovery", Proceeding KDD '07 Proceedings of the 13th ACM SIGKDD international conference on Knowledge discovery and data mining, 2007, pp. 460-469.*

Milaelian, Williams, Sachenbacher, "Autonomous Diagnosis Based on Software-Extended Behavior Models," Proceedings of the 8th International Symposium on Artificial Intelligence, Robotics, and Automation in Space (iSAIRAS-05), Munich, Germany, Sep. 2005, pp. 1-7.*

Vilalta, R., S. MA, Predicting rare events in temporal domains, Proc. of the 2002 IEEE Int'l Conf. on Data Mining, ICDM 2002, Dec. 9-12, 2002, pp. 474-481, Maebashi City, Japan.

Laxman, S., P. S. Sastry, A survey of temporal data mining, SADHANA, Academy Proceedings in Engineering Sciences, Apr. 2006, vol. 31, No. 2, pp. 173-198.

Holmes, Michael B., USPTO Office Action, U.S. Appl. No. 12/972,273, Mar. 12, 2012.

Holmes, M. B., U.S. Notice of Allowance, U.S. Appl. No. 12/972,273, May 17, 2013.

Kanstrén, Teemu., "A Framework for Observation-Based Modelling in Model-Based Testing", Retrieved at <<http://citeseerx.ist.psu.edu/viewdoc/download?doi=10.1.1.163.5156&rep=rep1&type=pdf>>, VTT Publications 727, 2010, pp. 218.

Lo, et al., "Automatic Steering of Behavioral Model Inference", Retrieved at <<http://www.lta.disco.unimib.it/Ita/uploads/papers/Lo-Steering-ESECFSE-2009.pdf>>, Joint 12th European Software Engineering Conference (ESEC) and 17th ACM SIGSOFT Symposium on the Foundations of Software Engineering (FSE-17), Aug. 24-28, 2009, pp. 10.

Hartman, et al., "Choosing a Test Modeling Language: a Survey", Retrieved at <<http://www.research.ibm.com/haifa/dept/services/papers/HVC06_survey-prelim.pdf>>, Hardware and Software, Verification and Testing, Second International Haifa Verification Conference, HVC, Oct. 23-26, 2006, pp. 15.

McGoveran, Jerry., "Comparing Two Verilog Fault Simulators", Retrieved at <<http://www.certuscg.com/fault1.html>>, Integrated System Design, Oct. 1995, pp. 6.

Mariani, et al., "Compatibility and Regression Testing of COTS-Component-Based Software", Retrieved at <<http://citeseerx.ist.psu.edu/viewdoc/download;jsessionid=B35A66EE57512510D2D0DFE19F80FC33?doi=10.1.1.138.3666&rep=rep1&type=pdf>>, 29th International Conference on Software Engineering (ICSE), May 20-26, 2007, pp. 10.

Flores, et al., "Towards Context-Aware Testing for Semantic Interoperability on PvC Environments", Retrieved at <<http://ieeexplore.ieee.org/stamp/stamp.jsp?tp=&arnumber=1399775>>, Proceedings of the IEEE International Conference on Systems, Man and Cybernetics, Oct. 10-13, 2004, pp. 1136-1141.

Yoon, et al., "Direct-Dependency-based Software Compatibility Testing", Retrieved at <<http://www.cs.umd.edu/~aporter/Docs/ase07.pdf>>, Proceedings of the twenty-second IEEE/ACM international conference on Automated software engineering, Nov. 5-9, 2007, pp. 1-4.

Lo, et al., "Mining Quantified Temporal Rules: Formalism, Algorithms, and Evaluation", Retrieved at <<http://research.microsoft.com/pubs/101173/Mining%20Quantified%20Temporal%20Rules%20-%20Formulation,%20Algorithms%20and%20Evaluation.pdf>>, h Working Conference on Reverse Engineering, WCRE, Oct. 13-16, 2009, pp. 10.

Agrawal, et al., "Fast Algorithms for Mining Association Rules", Retrieved at <<http://rakesh.agrawal-family.com/papers/vldb94apriori.pdf>>, Proceedings on Very Large Data Bases, 1994, pp. 13.

Alur, et al., "Synthesis of Interface Specifications for Java Classes", Retrieved at <<http://www.cs.uiuc.edu/~madhu/popl05.pdf>>, Proceedings of the 32nd ACM SIGPLAN-SIGACT symposium on Principles of programming languages, Jan. 12-14, 2005, pp. 12.

Ammons, et al., "Mining Specifications", Retrieved at <<http://www.cs.berkeley.edu/~bodik/research/popl02a.pdf>>, Proceedings of the 29th ACM SIGPLAN-SIGACT symposium on Principles of programming languages, Jan. 16-18, 2002, pp. 13.

Chen, et al., "Mining Parametric State-Based Specifications from Executions", Retrieved at <<http://www.ideals.illinois.edu/bitstream/handle/2142/10969/UIUCDCS-R-2008-3000.pdf?sequence=2>>, Technical Report, UIUCDCS-2008-3000, Sep. 2008, pp. 11.

El-Ramly, et al., "From Run-time Behavior to Usage Scenarios: An Interaction-Pattern Mining Approach", Retrieved at <<http://citeseerx.ist.psu.edu/viewdoc/download?doi=10.1.1.12.6234&rep=rep1&type=pdf>>, Proceedings of the eighth ACM SIGKDD international conference on Knowledge discovery and data mining, Jul. 23-25, 2002, pp. 10.

Ernst, et al., "Dynamically Discovering Likely Program Invariants to Support Program Evolution", Retrieved at <<http://www.cs.washington.edu/homes/mernst/pubs/invariants-tse2001.pdf>>, IEEE Transactions on Software Engineering, vol. 27, No. 2, Feb. 2001, pp. 99-123.

Gabel, et al., "Javert: Fully Automatic Mining of General Temporal Properties from Dynamic Traces", Retrieved at <<http://www.utdallas.edu/~mgg110030/publications/papers/fse08.pdf>>, Proceedings of the 16th ACM SIGSOFT International Symposium on Foundations of software engineering, Nov. 9-15, 2008, pp. 11.

Lorenzoli, et al., "Automatic Generation of Software Behavioral Models", Retrieved at <<http://ieeexplore.ieee.org/stamp/stamp.jsp?tp=&arnumber=4814161>>, Proceedings of the 30th international conference on Software engineering, May 10-18, 2008, pp. 501-510.

Ramanathan, et al., "Static Specification Inference Using Predicate Mining", Retrieved at <<http://citeseerx.ist.psu.edu/viewdoc/download?doi=10.1.1.85.6177&rep=rep1&type=pdf>>, Proceedings of the 2007 ACM SIGPLAN conference on Programming language design and implementation, Jun. 11-13, 2007, pp. 12.

Safyallah, et al., "Dynamic Analysis of Software Systems using Execution Pattern Mining", Retrieved at <<http://ieeexplore.ieee.org/stamp/stamp.jsp?tp=&arnumber=1631109>>, 14th IEEE International Conference on Program Comprehension, ICPC, 2006, pp. 5.

De Sousa, et al., "Detecting Implied Scenarios from Execution Traces", Retrieved at <<http://ieeexplore.ieee.org/stamp/stamp.jsp?tp=&arnumber=4400151>>, 14th Working Conference on Reverse Engineering, WCRE, Oct. 28-31, 2007, pp. 10.

Yang, et al., "Dynamically Inferring Temporal Properties", Retrieved at <<http://www.cs.virginia.edu/~jy6q/paste04.pdf>>, Proceedings of the 5th ACM SIGPLAN-SIGSOFT workshop on Program analysis for software tools and engineering, Jun. 7-8, 2004, pp. 6.

Yang, et al., "Perracotta: Mining Temporal API Rules from Imperfect Traces", Retrieved at <<http://www.irisa.fr/lande/lande/icse-proceedings/icse/p282.pdf>>, Proceedings of the 28th international conference on Software engineering, May 20-28, 2006, pp. 282-291.

* cited by examiner

COMPATIBILITY TESTING USING TRACES, LINEAR TEMPORAL RULES, AND BEHAVIORAL MODELS

CROSS-REFERENCE TO RELATED APPLICATIONS

This Application is a continuation-in-part of U.S. patent application Ser. No. 12/972,273, filed on Dec. 17, 2010, by Venkatesh-Prasad Ranganath, et al., and entitled "TEMPORAL RULE-BASED FEATURE DEFINITION AND EXTRACTION," the subject matter of which is incorporated herein by this reference.

BACKGROUND

1. Technical Field

A "Compatibility Tester" provides various techniques for extracting observable behaviors from different implementations of a system (e.g., software, operating systems, device drivers, hardware interfaces, devices, etc.) with those behaviors then being used for compatibility testing based on comparisons of various features of the extracted behaviors.

2. Background Art

When an OS, or other software or system, is upgraded or changed on a particular computing device, the question arises as to whether devices or different versions or implementations of some previously compatible connected system will remain compatible with the upgraded or changed system. For example, when upgrading a computer OS from the Windows® 7 to Windows® 8 or changing a USB controller from one standard to another (e.g., USB 2.0 to USB 3.0), there may be a question of whether all of the devices currently connected to a user's computer will remain compatible between the different versions of the OS or controller.

Various techniques for testing such compatibility issues generally deal with an evaluation of the commands and timing that hardware devices or software systems use relative to software and hardware frameworks supported by the OS. These commands include data messages or signals across various wired or wireless busses or protocols, such as PCI, USB, FireWire®, Thunderbolt™, IEEE 802.x, etc. Strategies for compatibility testing often include functional testing that involves a suite of tests to check whether the behavior of a driver or software follows a particular design document that is often referred to as a specification. Typically, such testing is performed using techniques including physically testing every device under different versions of the system, simulating a device or system via a software model, or by using hardware simulators that can be programmed to simulate various devices in particular classes of devices (e.g., input devices, output devices, etc.).

In other words, compatibility testing is aimed at verifying whether the device or Application under test interacts and functions as expected with other software or system versions. However, given the large number of existing devices and systems (numbering in the billions, with many tens of thousands of unique devices and even more unique software components), compatibility testing issues can be challenging and extremely time-consuming.

Other approaches in the domain of software testing involve model-based testing. In conventional model-based testing, the system under test is typically represented by a model describing its expected behavior at a higher abstraction level, and a set of chosen algorithms are used to generate tests from this model. In general, models are typically manually constructed based on some software specification or are created using an observation-based modeling approach. In either case, the model is typically refined and verified against a device specification or software specification to identify potential compatibility problems.

Related techniques use finite state models to validate and verify software systems. Construction of such models is often automatically generated by mining execution traces to infer statistically significant temporal properties that capture relations between non-consecutive and possibly distant events. The mined properties steer the learning of behavioral models that are then used for compatibility testing. Again, the resulting models are typically verified against a device specification or software specification to identify compatibility problems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Compatibility Tester," as described herein, provides various techniques for extracting observable behaviors from different system implementations (e.g., software, operating systems, device drivers, hardware interfaces, devices, etc.). The Compatibility Tester then performs compatibility testing via various comparisons of the extracted behaviors. In particular, traces (e.g., bus level signals between controllers and hardware devices or commands between software stacks) representing observable behaviors of different implementations of a system are first captured by the Compatibility Tester. Temporal and structural rules are then mined from these traces. The Compatibility Tester then uses the mined rules (or a model constructed from a collection of those rules) in a "Rule Checking" process that determines whether reference rules (mined from a presumably compatible system) are compatible with rules mined from test traces of a second system. Invalid rules are flagged as potential behavioral compatibility bugs. Alternately, the Compatibility Tester uses the mined rules in a "Rule Diffing" process that performs set differencing of the behavioral and structural rules mined from the different system implementations, with differences between the systems again being flagged as potential behavioral compatibility bugs.

More specifically, given two implementations of a system (e.g., "V1" and "V2"), the Compatibility Tester first collects reference traces that capture the observable behavior of V1 and mines prevalent structural rules (constraints on fields of events) and linear temporal rules as features of the traces. Similarly, the Compatibility Tester also collects test traces that capture the observable behavior of V2 and again mines prevalent structural rules and linear temporal rules as features of the traces.

In various embodiments, the Compatibility Tester then uses these mined rules to perform a "Rule Checking" procedure that checks whether reference rules are (prevalently) valid in test traces, with any invalid rules then being flagged as potential behavioral compatibility bugs. Alternately, in other embodiments, the Compatibility Tester uses these mined rules to perform a "Rule Diffing" process that performs set differencing of the behavioral and structural rules mined from test and reference traces (i.e., the rules mined from V1 and V2), with any differences between the systems being flagged as potential behavioral compatibility bugs. For example, if V1 is known to be compatible, differences in the behavior of V2 relative to one or more particular rules of V1 may indicate potential compatibility problems for V2.

In view of the above summary, it is clear that the Compatibility Tester described herein provides various unique techniques for extracting observable behaviors from different implementations of a system with those behaviors then being used for compatibility testing based on comparisons of various features of the extracted behaviors. In addition to the just described benefits, other advantages of the Compatibility Tester will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
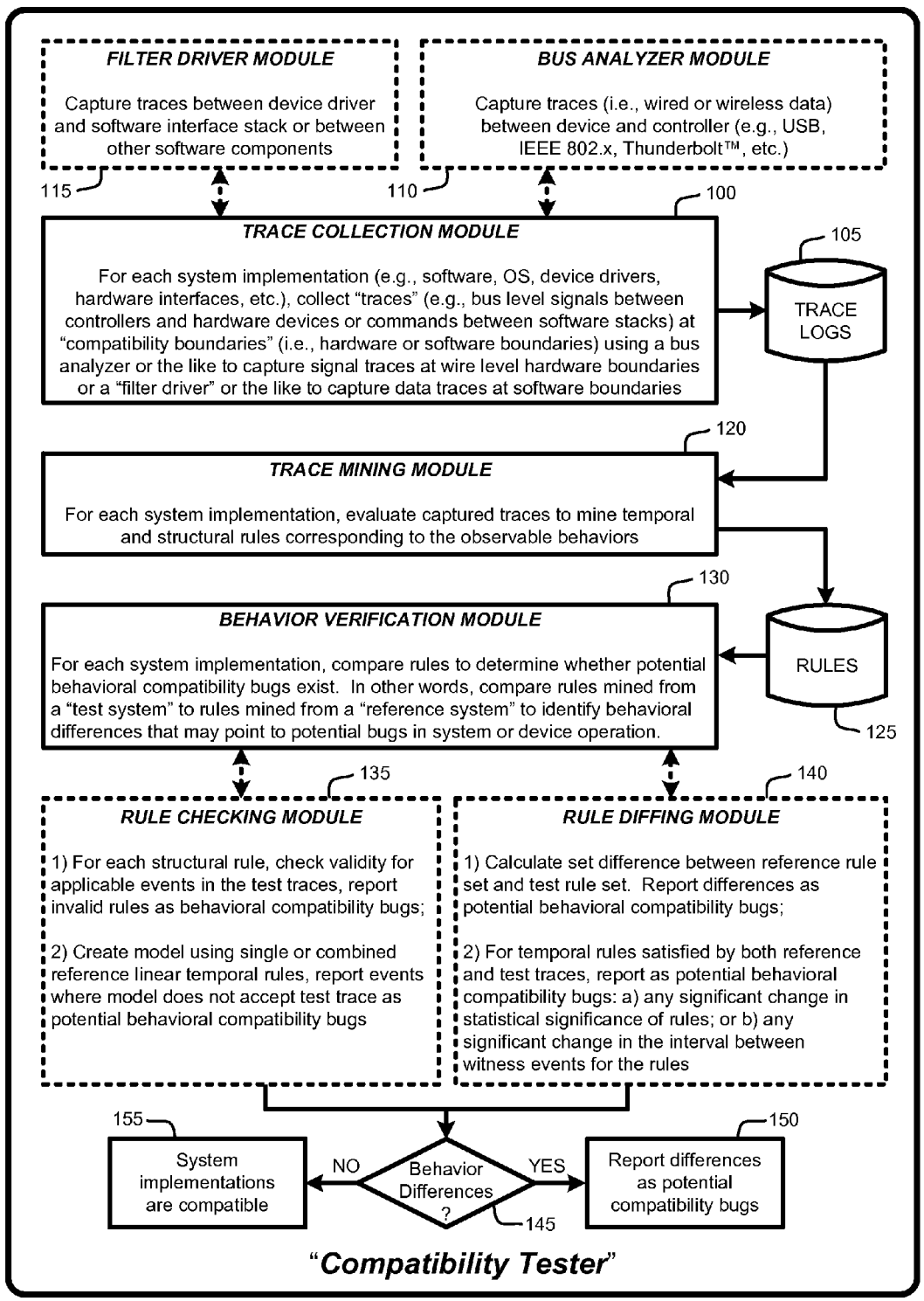
FIG. 1 illustrates a general flow diagram for extracting observable behaviors from different implementations of a system with those behaviors then being used for compatibility testing based on comparisons of various features of the extracted behaviors using a "Compatibility Tester," as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Compatibility Tester," as described herein, provides various techniques for extracting observable behaviors from different implementations of a system (e.g., software, operating systems, device drivers, hardware interfaces, devices, etc.). Those extracted behaviors are then used for compatibility testing based on comparisons of various features of the extracted behaviors. More specifically, traces (e.g., bus level signals between controllers and hardware devices or commands between software stacks or other software components) representing observable behaviors of different implementations of a system are captured. Temporal and structural rules are then mined from these traces. The mined rules (or a model constructed from a collection of those rules) are used by a "Rule Checking" process that determines whether reference rules (mined from a known compatible system) are compatible with rules mined from test traces of a second system. Invalid rules are flagged as behavioral compatibility bugs. Alternately, the mined rules are used by a "Rule Diffing" process that performs set differencing of the behavioral and structural rules mined from the different system implementations, with differences between the systems flagged as potential behavioral compatibility bugs.

As noted above, the "Compatibility Tester," provides various techniques for extracting observable behaviors from different implementations of a system with those behaviors then being used for compatibility testing. However, it should also be understood that these same techniques can also be used to compare the behavior of different software components or hardware devices of the same class, e.g., two different implementations keyboard device drivers directed to the same keyboard, or two different implementations of keyboard input devices under the same OS, driver, software abstraction layer or other software component. For example, two entirely different implementations of a USB 3.0 drivers or software stacks developed for a particular operating system by different companies will preferably perform in compatible ways. The Compatibility Tester described herein is clearly capable of evaluating behavioral differences (and thus potential compatibility bugs) between the different implementations of the same class of software stacks. However, given this understanding of the intended scope of the Compatibility Tester, for purposes of explanation, the following discussion will generally refer to different systems or system implementations in the general sense, with a first system (possibly a known compatible system) being referred to as a "reference system," and a second system being checked for compatibility being referred to as a "test system." Corresponding traces and rules are thus referred to herein as "reference traces" and "reference rules" or "test traces" and "test rules."

Note that the use of temporal rules as features of traces is described in detail in co-pending U.S. patent application Ser. No. 12/972,273, filed on Dec. 17, 2010, by Venkatesh-Prasad Ranganath, et al., and entitled "TEMPORAL RULE-BASED FEATURE DEFINITION AND EXTRACTION," the subject matter of which is incorporated herein by this reference. In general, many types of data contain sequences having events that occur at a point in time such that there is a clear temporal ordering between each event. A sequence of events (referred to as a "trace") can be processed using features extracted from the data. This processing includes classifying a trace, clustering similar traces, and fingerprinting the traces.

In other words, the processes described in the aforementioned co-pending U.S. Patent Application provide various temporal rule-based feature extraction mechanisms for extracting features from temporal-based rules satisfied by a trace and leveraging the rules to either use as features or to extract additional features. However, it should be understood that the Compatibility Tester described herein does not depend on specific rule checking techniques such as those described in the aforementioned co-pending U.S. Patent Application. Instead, the Compatibility Tester provides various techniques for performing compatibility testing (i.e., "Rule Checking" and "Rule Diffing" techniques) that generally use rule-checking and rule-mining techniques as a black box input.

1.1 System Overview:

The processes summarized above are illustrated by the general system diagram of FIG. 1. In particular, the system diagram of FIG. 1 illustrates the interrelationships between program modules for implementing various embodiments of the Compatibility Tester, as described herein. Furthermore, while the system diagram of FIG. 1 illustrates a high-level view of various embodiments of the Compatibility Tester, FIG. 1 is not intended to provide an exhaustive or complete illustration of every possible embodiment of the Compatibility Tester as described throughout this document.

In addition, it should be noted that any boxes and interconnections between boxes that may be represented by broken or dashed lines in FIG. 1 represent alternate embodiments of the Compatibility Tester described herein, and that any or all of these alternate embodiments, as described below, may be used in combination with other alternate embodiments that are described throughout this document.

In general, as illustrated by FIG. 1, the processes enabled by the Compatibility Tester begin operation by using a trace collection module 100 to capture system traces (i.e., trace logs 105) for each implementation of a system to be compared. More specifically, for each system implementation, the trace collection module 100 collects "traces" (i.e., observable behaviors represented by bus level signals or data sent between software stacks or other software components) at "compatibility boundaries" (i.e., hardware or software boundaries) using a bus analyzer or the like to capture signal traces at wire level hardware boundaries or a "filter driver" or the like to capture data traces at software boundaries.

In general, a filter driver such as filter driver module 115 simply provides an inline software instrumentation package between a device driver and software abstraction layer, core stack, or other software component that captures and records message traffic (i.e., trace logs 105) in either direction between those software layers. Similarly, a bus analyzer module 110 provides corresponding functionality by capturing message traffic (i.e., trace logs 105) representing wired or wireless data in either direction between a device and the corresponding device controller.

Next, given the trace logs 105, the Compatibility Tester uses a trace mining module 120 to evaluate the captured traces in order to mine temporal and structural rules corresponding to observable behaviors of each system. As discussed in further detail in Section 2.1, a simple example of an observable behavior representing a temporal rule that may be extracted from captured traces is that "event A is always followed by event B." Thus, if this rule is determined to be a valid rule for a reference system, violation or invalidity of this rule in a test system may indicate a potential compatibility bug in the test system.

More specifically, once the trace logs 105 have been mined by the trace mining module 120 to construct a set of rules 125 for each system implementation, a behavior verification module 130 then compare the set of rules for each system implementation to determine whether potential behavioral compatibility bugs exist. In other words, the behavior verification module 130 compares rules mined from a "test system" to rules mined from a "reference system" to identify behavioral differences that may point to potential bugs in system or device operation. Comparison of rules is performed using either a rule checking module 135 or a rule doffing module 140.

In general, the rule checking module 135 evaluates or verifies system behaviors as a function of the extracted rules. In particular, for each structural rule mined from a reference system (e.g., V1), the rule checking module 135 checks validity for applicable events in the test traces mined from a test system (e.g., V2). The rule checking module 135 then reports invalid rules as potential behavioral compatibility bugs. In other words, for each structural rule mined from the reference system, the rule checking module 135 determines whether events, traces or rules mined from the reference system are valid relative to the structural rules of the test system. Further, the rule checking module 135 may also create one or models for the reference system using single or combined linear temporal rules. The rule checking module 135 then reports events where any of the models do not accept any particular test trace as a potential behavioral compatibility bug. In other words, if a test trace captured from the test system could not be generated by a corresponding reference model derived from the rules mined from the traces of the reference system, then that test trace is not valid, and may indicate a potential compatibility bug.

In general, the rule diffing module 140 evaluates or verifies system behaviors by identifying differences in the sets of rules mined for each system implementation. In particular, the rule diffing module 140 calculates set differences between a reference rule set and test rule set corresponding to the different system implementations. The rule diffing module 140 then reports differences in these sets as potential behavioral compatibility bugs. Further, for temporal rules satisfied by both reference and test traces, the rule diffing module 140 reports any significant change in statistical significance of particular rules as potential behavioral compatibility bugs, and also reports any significant change in the temporal interval between witness events for particular rules as potential behavioral compatibility bugs.

In either case, whether either or both the rule checking module 135 or the rule diffing module 140 are used by the behavior verification module 130, behavioral differences 145 are reported 150 as potential compatibility bugs. If no behavioral differences are identified, then the different system implementations are presumed 155 to be compatible.

Note that any "report" generated for informing the user of potential compatibility bugs between system implementations may be presented in any format desired. Further, this report may be interactive in a manner that allows the user to query particular implementation events or operations, to sort fields of the report based on rule confidence levels, relevancy or occurrence of particular mined rules, behaviors, events, etc. For example, as noted in below in Section 2.1, and as described in further detail in the aforementioned co-pending US Patent Application, "confidence levels" are computed in various embodiments for particular rules based on an evaluation of the events and behaviors associated with those mined rules. Rules having confidence levels greater than a predetermined or user adjustable threshold may be considered to be "significant rules." As such, given the computation of statistical information and significance or confidence associated with such rules, behavioral reports generated by Compatibility Tester can be sorted, searched, etc., to identify or focus on particular events or behaviors, as well as whether one or more mined rules is considered to be significant.

For example, the Compatibility Tester provides the capability to associate ordinal ranks to particular rules based on different statistical measures (e.g., support and/or confidence levels). Therefore, given rules that are common to both system implementations, the reports generated by the Compatibility Tester can be used to highlight or otherwise present information such as whether a particular rule has a high statistical measure in one system while having a low statistical measure in the other system. If so, then such rules can be flagged as a potential compatibility differences between those systems. Note that these examples are not intended to limit the scope of the reporting capabilities of the Compatibility Tester described herein, but are intended merely as simple examples of the use of such reporting as an aid in identifying potential compatibility bugs between different system implementations.

2.0 Operational Details of the Compatibility Tester:

The above-described program modules are employed for implementing various embodiments of the Compatibility Tester. As summarized above, the Compatibility Tester provides various techniques for extracting observable behaviors from different implementations of a system with those behaviors then being used for compatibility testing based on comparisons of various features of the extracted behaviors. The following sections provide a detailed discussion of the operation of various embodiments of the Compatibility Tester, and of exemplary methods for implementing the program modules described in Section 1 with respect to FIG. 1. In particular, the following sections provide examples and operational details of various embodiments of the Compatibility Tester, including: terminology used in discussing various embodiments of the Compatibility Tester; "compatibility boundaries" for capturing traces; and behavior comparisons and verification.

2.1 Terminology:

Device drivers are software programs that sit between the hardware and Application software layers as one of the subsystems in the computer hardware and software interaction process. The hardware abstraction layer of the operating system (OS) interacts directly with the device driver subsystem to send and receive commands between the Application software layer and the actual device hardware. As discussed herein, with respect to software level traces, a "trace" is captured by using a filter driver or the like to capture data crossing "compatibility boundaries" in either direction between a device driver and a system abstraction layer, core stack, or other software component. A simple example of this concept is to use an inline "filter driver" or the like to capture communications or data passing between a software device driver for a USB keyboard input device and a USB core stack of an operating system.

However, it should be understood that the Compatibility Tester is not limited to use with USB type interfaces or drivers, and that any boundary between any driver type and corresponding core stack, abstraction layer, or other software component, can be instrumented using a filter driver or the like to capture communications across such boundaries. Examples include, but not limited to device drivers for PCI, PCI-Express, USB, FireWire®, Thunderbolt™, Ethernet, IEEE 802.x, etc., and corresponding software abstraction layers or core stacks for enabling communications between corresponding devices and the OS. In other words, the trace capture process discussed herein can be employed at any software interface (Application APIs, etc.) or any wired or wireless hardware interface, and can even be employed within the internal implementation of software components of any type (through tracing exposed by the components, instrumentation, etc.).

Similarly, with respect to hardware level traces, traces are captured using a bus analyzer or other device for capturing or recording message traffic or data signals in either direction between a between a device controller and a wired or wirelessly connected device. Examples of hardware device controllers include, but are not limited to PCI, USB, SATA, SCSI, FireWire®, Thunderbolt™, IEEE 802.x, Bluetooth®, etc. Note that instrumenting such interfaces for capturing message traffic is well known to those skilled in the art, and will not be described in detail herein.

Further, "temporal rules" represent a sequence of one or more events (e.g., event A always followed by event B, or event C always precedes the combination of events where event A is followed by event B) that is identified by mining trace logs for a particular system or device. It is said that a particular rule is "satisfied by a trace" when a trace is identified in one system that validates (i.e., matches) a rule. In other words, a rule "is satisfied by a trace" when the sequence of events in the rule occur in the trace in the same order. Given sufficiently large trace logs captured for a particular system, such temporal rules can be mined from those logs and used to identify differences in systems.

Similarly, "structural rules" represent constraints on "fields" of events that are mined from the traces. For example, assuming that a particular system uses a field named "IrpID" with respect to a particular event A, a simple example of a structural rule mined from the traces for that event might be that the IrpID field in event A is always non-null. This structural rule can then be compared to event A for a second system. If that comparison shows that the IrpID field in event A is always null for the second system, then difference in the corresponding structural rules between the first and second systems is flagged as an indication of a potential compatibility bug.

As discussed in the aforementioned co-pending US Patent Application, an event of type ô is a set of equality constraints relating all positions of ô to an atomic value. An atomic value is one that is not further divisible by any other value. In every event type, a set of positions are identified as a primary. Every non-empty subset of an event containing at least one equality constraint involving a primary position is designated as an "abstraction" of the event.

An abstraction with equality constraints that involve variables (instead of values) and a mapping from variables to values is called a quantified abstraction. An abstraction without variables is known as an unquantified abstraction. The aforementioned co-pending US Patent Application document describes techniques for generating abstractions of events and relating such abstractions by considering valuation mappings.

Further, as discussed in the aforementioned co-pending US Patent Application, between every two distinct events in a trace, the described temporal rule-based feature extraction techniques recognize two temporal orders captured by the operators. The first temporal order is represented by the symbol "$\xrightarrow{*}$", which means "followed by." The second temporal order is represented by the symbol "$\xleftarrow{*}$", which means "preceded by." In these operators, the first event is a "trigger event" and the second event is an "effect event." Based on the relation between events and abstractions, the ordering and operators are applicable to abstractions as well. Similarly, there are two other temporal orders "→!" and "!←" that constrain the events that can occur between trigger and effect events.

In addition, as discussed in the aforementioned co-pending US Patent Application, a temporal ordering between abstractions is a sequence of abstractions with each consecutive pair of abstractions being related by a temporal operator. Orderings admit a grouping operator ( ) to indicate precedence of a sub-ordering over another sub-ordering. For example, the expression $A \xleftarrow{*} (B \xrightarrow{*} C)$ can be interpreted as "event A is preceded by the subgroup of event B followed by event C." Further, every ordering o is associated with a set of abstraction positions Pos(o) that represents an index of the abstractions in o.

As discussed in the aforementioned co-pending US Patent Application, the support for an abstraction is the total number of events in the given trace set that are supersets of the abstraction. A subsequence of a trace is a "witness" to an ordering if the following are true. First, every event in the subsequence is represented by an abstraction in the ordering. Second, the order of the events in the sequence is identical to the order between the corresponding abstractions in the ordering. Support, s(o), for an ordering o is the number of witnesses to the ordering in the given trace set. A confidence level, c(o), for an ordering is the ratio of the support for the ordering and the support for a trigger event of the ordering.

As discussed in the aforementioned co-pending US Patent Application, a trace t "satisfies" a rule r, if it contains a witness to the corresponding ordering. A set of rules satisfied by a trace t is denoted as R(t). Similarly, a set of rules satisfied by a trace set T is denoted as R(T). A temporal ordering with a witness is a temporal rule r. Given a support threshold S and confidence threshold C, an ordering with support equal to or greater than S is referred to as a "candidate rule." A candidate rule with confidence equal to or greater than C is referred to as a "significant rule."

2.2 "Compatibility Boundaries" for Capturing Traces:

In general, as noted above, "compatibility boundaries" in a given system exist between software abstraction layers and between device controllers and the wired or wirelessly connected devices.

Figure 2:
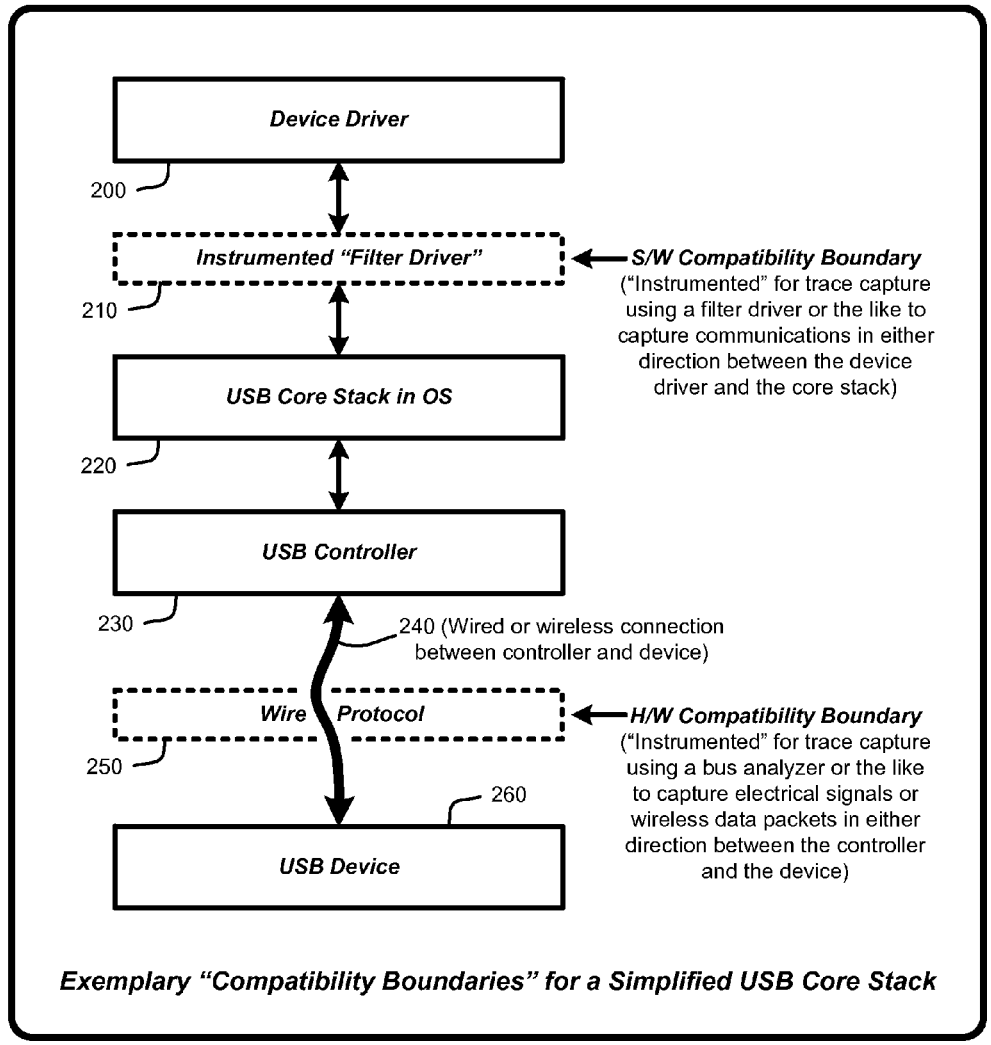
FIG. 2 provides an example of "compatibility boundaries" relative to a simplified USB core stack and an attached USB device, as described herein.

For example, as illustrated by FIG. 2, with respect to a simplified implementation of a USB device connected to and controlled by a computing device, a device driver 200 running under the system OS provides commands to a USB core stack 220. Recording or capturing such commands or message traffic (i.e., traces) is achieved by using a filter driver 210 or the like to "instrument" the "compatibility boundary" between the device driver 200 and the USB core stack 220.

In other words, the filter driver 210 enables tracing of all events at an upper compatibility boundary (between the USB core stack 220 and device driver 200). As noted above, the captured traces are then evaluated to extract "rules" for each system implementation (see, for example, the aforementioned co-pending US Patent Application). The resulting rules for each system are then either compared directly or used to construct one or more models that are compared to determine whether or how the behavior is different between an earlier stack or driver implementation or other software component and a new stack or driver implementation or other software component.

Further, also as illustrated by FIG. 2, a physical USB controller 230 receives commands or message traffic from the USB core stack 220. The USB controller 230 then passes this data to a connected USB device 260 via a wired or wireless connection 240 using various wire protocols 250. Similar to the compatibility boundary between the device driver 200 and the USB core stack 220, the wire protocol 250 represents a compatibility boundary provided by a hardware interface that can be instrumented to capture the commands or message traffic (i.e., traces) between the USB controller 230 and the USB device 260. Examples of techniques for capturing such traffic include the use of a bus analyzer or the like in the case of a wired connection between the USB controller 230 and the USB device 260.

In other words, the bus analyzer (or other wired or wireless signal capture device) enables tracing of commands or message traffic at the wire level (or wireless communications level) between a controller such as the USB controller 230 and a connected device such as USB device 260. As noted above, the captured traces are then evaluated to extract "rules" for each system implementation (see, for example, the aforementioned co-pending US Patent Application). The resulting rules for each system are then either compared directly or used to construct one or more models that are compared to determine whether or how the behavior is different between an earlier controller or device implementation and a new controller or device implementation.

As noted above, the Compatibility Tester is capable of operating with a wide variety of different OS versions or implementations, different hardware versions or implementations, different device versions or implementations, etc. in order to identify behavioral differences between different system versions or implementations or between different devices or drivers under the same OS version. As such, it should be understood that the above-described USB-based example is provided only for purposes of example and is not intended to limit the use of the Compatibility Tester to USB type implementations.

2.4 Behavior Comparisons and Verification:

As noted above, the Compatibility Tester-based processes described herein provide various techniques for extracting observable behaviors from different implementations of a system with those behaviors then being used for compatibility testing based on comparisons of various features of the observable behaviors of those systems. In general, these techniques focus on identifying compatibility issues in terms of structural rules and temporal rules governing observable behaviors at "compatibility boundaries" of the system, i.e., the behavior visible at any "public" interface of a system.

Figure 3:
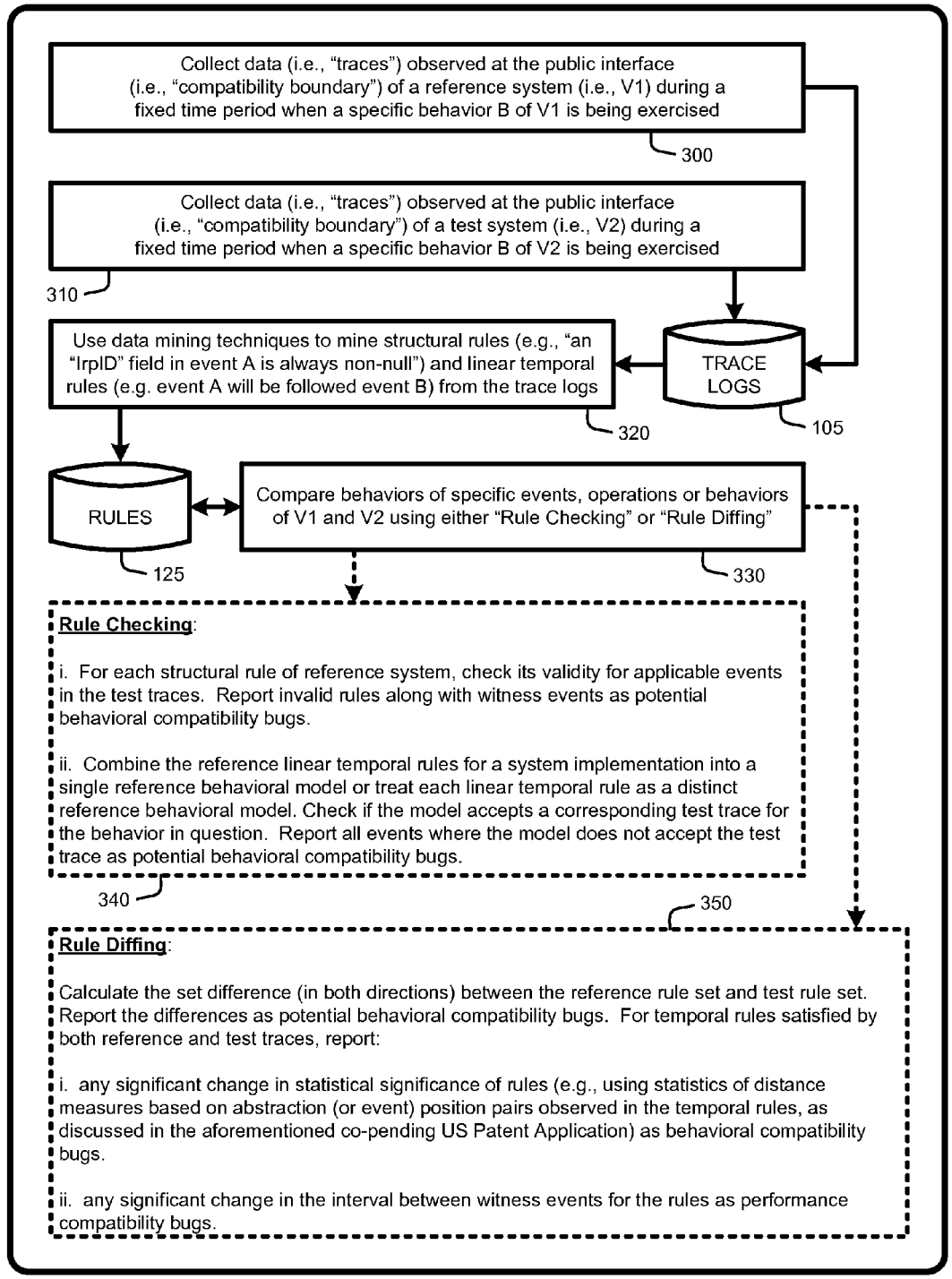
FIG. 3 illustrates a general system flow diagram that illustrates exemplary methods for implementing various embodiments of the Compatibility Tester, as described herein.

The processes described above with respect to FIG. 1 and FIG. 2, and in further view of the detailed description provided above are illustrated by the general operational flow diagram of FIG. 3. In particular, FIG. 3 provides an exemplary operational flow diagram that summarizes the operation of some of the various embodiments of the Compatibility Tester. Note that FIG. 3 is not intended to be an exhaustive representation of all of the various embodiments of the Compatibility Tester described herein, and that the embodiments represented in FIG. 3 are provided only for purposes of explanation.

Further, it should be noted that any boxes and interconnections between boxes that are represented by broken or dashed lines in FIG. 3 represent optional or alternate embodiments of the Compatibility Tester described herein, and that any or all of these optional or alternate embodiments, as described below, may be used in combination with other alternate embodiments that are described throughout this document.

In general, as illustrated by FIG. 3, the Compatibility Tester extracts and examines the behaviors of different systems by first collecting 300 reference data observed (i.e., traces 105) at the public interface (i.e., compatibility boundary) of a reference system (i.e., V1) during a fixed time period when a specific behavior B of the reference system is being exercised. The collected data (i.e., traces 105) is a sequence of data points ordered by their occurrence in time. In the case of USB support in Windows®, the public interfaces include a USB hardware port exposed by the host and a USB device driver interface (DDI) exposed by a USB software stack. Similarly, in this example, the collected data includes on-the-wire bits (e.g., data signals between the controller and an attached device) and various USB DDI invocations along with their input/output arguments.

As illustrated by FIG. 3, the same type of data traces collected for the reference system is also collected 310 for a test system. More specifically the Compatibility Tester collects test data (i.e., traces 105) observed at the public interface (i.e., compatibility boundary) of the system (i.e., V2) during a fixed time period when a specific behavior B of the test system is being exercised.

Next, the Compatibility Tester uses data mining 320 techniques to mine a set of rules 125 for each system from the corresponding traces 105. These mined rules include structural rules (e.g., an "IrpID" field in event A is always non-null) and linear temporal rules (e.g., event A will be followed event B) and partition them based on their support and confidence and the chosen support and confidence thresholds.

Next, given the traces and rules extracted or mined from the reference and test systems, the Compatibility Tester performs a comparison 330 of those traces and rules between the reference and test systems using either the aforementioned "Rule Checking" process or the aforementioned "Rule Diffing" process.

More specifically, the "rule checking" 340 process involves performing the following processes:
  i. For each structural rule, check its validity for applicable events in the test traces. Report invalid rules along with witness events as potential behavioral compatibility bugs. Note that a discussion of "witnesses" to events is provided in the aforementioned co-pending US Patent Application.
  ii. Combine the reference linear temporal rules into a single reference behavioral model (alike a nondeterministic finite automaton) or treat each linear temporal rule as a distinct reference behavioral model. Check if the model accepts the test trace. Report all events where the model does not accept the test trace as behavioral compatibility bugs.

Note that the above-described rule checking approach does not depend on specific rule checking techniques, e.g. model checking, regular expression matching, the aforementioned model testing approaches, etc. Instead, it provides a general technique for perform compatibility testing using any desired rule checking technique as a black box given the captured traces and mined rules.

In contrast, the "rule diffing" 350 process involves calculating a set difference (in both directions) between the reference rule set and test rule set. Any resulting set differences are reported as potential behavioral compatibility bugs. Further, for temporal rules satisfied by both reference and test traces, report:
  i. any significant change in statistical significance of rules (e.g., using statistics of distance measures based on abstraction (or event) position pairs observed in the temporal rules (as discussed in the aforementioned co-pending US Patent Application) as potential behavioral compatibility bugs;
  ii. any significant change in the time interval between witness events (as discussed in the aforementioned co-pending US Patent Application) for the rules as potential performance compatibility bugs.

Figure 4:
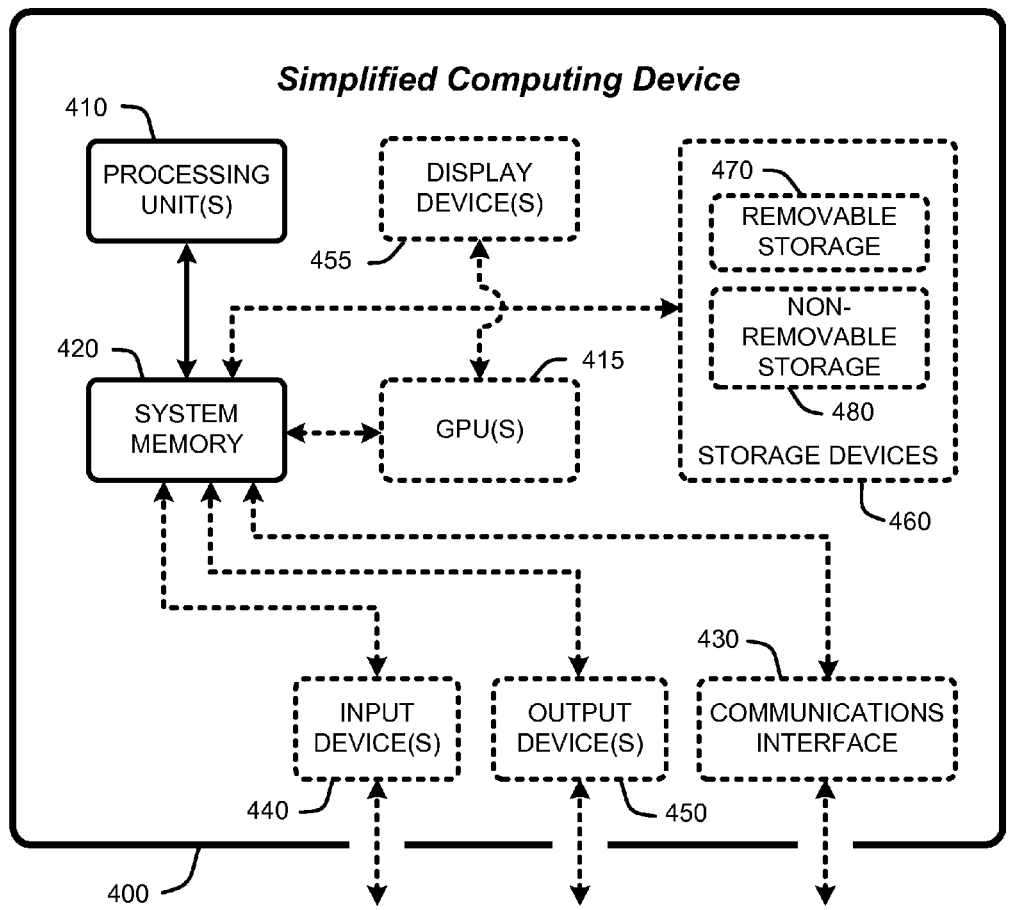
FIG. 4 is a general system diagram depicting a simplified general-purpose computing device having simplified computing and I/O capabilities for use in implementing various embodiments of the Compatibility Tester, as described herein.

3.0 Exemplary Operating Environments:

The Compatibility Tester described herein is operational within numerous types of general purpose or special purpose computing system environments or configurations. FIG. 4 illustrates a simplified example of a general-purpose computer system on which various embodiments and elements of the Compatibility Tester, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device represented by computer 400. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Compatibility Tester, the device should have a sufficient computational capability and system memory to enable basic computational operations. In particular, as illustrated by FIG. 4, the computational capability is generally illustrated by one or more processing unit(s) 410, and may also include one or more GPUs 415, either or both in communication with system memory 420. Note that that the processing unit(s) 410 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 430. The simplified computing device of FIG. 4 may also include one or more conventional computer input devices 440 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional computer output devices 450 (e.g., display device(s) 455, audio output devices, video output devices, devices for transmitting wired or wireless data transmissions, etc.). Note that typical communications interfaces 430, input devices 440, output devices 450, and storage devices 460 for general-purpose computers are well known to those skilled in the art, and will not be described in detail herein.

The simplified computing device of FIG. 4 may also include a variety of computer readable media. Computer readable media can be any available media that can be accessed by computer 400 via storage devices 460 and includes both volatile and nonvolatile media that is either removable 470 and/or non-removable 480, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Compatibility Tester described herein, or portions thereof, may be stored, received, transmitted, or read from any desired combination of computer or machine readable media or storage devices and communication media in the form of computer executable instructions or other data structures.

Finally, the Compatibility Tester described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Compatibility Tester has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Compatibility Tester. It is intended that the scope of the invention be limited not by this detailed description, but rather by the claims appended hereto.

What is claimed is:

1. A method for performing automated compatibility testing, comprising steps for: for a first system implementation, capturing traces of data crossing a first "compatibility boundary"; for a second system implementation, capturing traces of data crossing a second compatibility boundary corresponding to the first compatibility boundary; for each system implementation, performing data mining operations on the captured traces to derive a set of behavioral rules for each system implementation, said behavior rules including zero or more "structural rules" that represent constraints on "fields" of events and zero or more "temporal rules" that represent a sequence of one or more events; comparing one or more rules of the set of rules for the first system implementation to corresponding rules of the second system implementation; and reporting any differences between any rules in the sets of rules for the different system implementations as potential compatibility bugs.

2. The method of claim 1 wherein the temporal rules represent a linear sequence of one or more events identified in the captured traces.

3. The method of claim 1 wherein each structural rule represents a constraint on a "field" of an event identified in the captured traces.

4. The method of claim 1 wherein comparing one or more of the set of rules for the first system implementation to corresponding rules of the second system implementation further comprises steps for performing a "rule checking" process, said rule checking process comprising:
for each structural rule of one of the two system implementations, checking validity for corresponding events in the traces of the other system implementation and reporting any invalid rules as potential behavioral compatibility bugs; and
creating one or more behavioral models using one or more temporal rules of one of the two system implementations and reporting events where any of the models does not accept a corresponding trace from the other system implementation as potential behavioral compatibility bugs.

5. The method of claim 1 wherein comparing one or more of the set of rules for the first system implementation to corresponding rules of the second system implementation further comprises steps for performing a "rule diffing" process, said rule diffing process comprising:
calculating a set difference between the sets of rules for each system implementation and reporting differences in those sets as potential behavioral compatibility bugs; and
for temporal rules satisfied by the traces of both system implementations, reporting as potential behavioral compatibility bugs:
any significant change in statistical significance of rules, and
any significant change in a time interval between witness events for any particular rules.

6. The method of claim 1 wherein the first and second system implementations are different implementations of the same class of hardware device.

7. The method of claim 1 wherein the first and second system implementations are different implementations of the same operating system software.

8. The method of claim 1 wherein the first and second system implementations are different implementations of the same class of device driver software.

9. The method of claim 1 wherein the first and second system implementations are different implementations of the same software abstraction layer within an operating system.

10. An automated compatibility tester, comprising: a device for capturing traces of data crossing a first "compatibility boundary" of a first system implementation during a fixed time period when a specific behavior of the first system implementation is being exercised; for a second system implementation, a device for capturing traces of data crossing a second compatibility boundary corresponding to the first compatibility boundary during a fixed time period when the same specific behavior is being exercised in the second system; a device for performing data mining operations on the captured traces for each system implementation to derive a set of behavioral rules for each system implementation, said behavior rules including zero or more "structural rules" that represent constraints on "fields" of events and zero or more "temporal rules" that represent a sequence of one or more events; a device for comparing one or more rules of the set of rules for the first system implementation to corresponding rules of the second system implementation; and reporting any differences between any rules in the sets of rules for the different system implementations as potential compatibility bugs.

11. The automated compatibility tester of claim 10 wherein the temporal rules represent a linear sequence of one or more events identified in the captured traces.

12. The automated compatibility tester of claim 10 wherein each structural rule represents a constraint on a "field" of an event identified in the captured traces.

13. The automated compatibility tester of claim 10 wherein comparing one or more of the set of rules for the first system implementation to corresponding rules of the second system implementation further comprises steps for performing a "rule checking" process, said rule checking process comprising:
- for each structural rule of one of the two system implementations, checking validity for corresponding events in the traces of the other system implementation and reporting any invalid rules as potential behavioral compatibility bugs; and
- creating one or more behavioral models using one or more temporal rules of one of the two system implementations and reporting events where any of the models does not accept a corresponding trace from the other system implementation as potential behavioral compatibility bugs.

14. The automated compatibility tester of claim 10 wherein comparing one or more of the set of rules for the first system implementation to corresponding rules of the second system implementation further comprises steps for performing a "rule diffing" process, said rule diffing process comprising:
- calculating a set difference between the sets of rules for each system implementation and reporting differences in those sets as potential behavioral compatibility bugs; and
- for temporal rules satisfied by the traces of both system implementations, reporting as potential behavioral compatibility bugs:
  - any significant change in statistical significance of rules, and
  - any significant change in a time interval between witness events for any particular rules.

15. A computer-readable storage hardware device having computer executable instructions stored therein for identifying potential compatible bugs in different system implementations, said instructions comprising: capturing traces of data crossing a first "compatibility boundary" of a first system implementation during a fixed time period when a specific behavior of the first system implementation is being exercised; for a second system implementation, capturing traces of data crossing a second compatibility boundary corresponding to the first compatibility boundary during a fixed time period when the same specific behavior is being exercised in the second system; performing data mining operations on the captured traces for each system implementation to derive a set of behavioral rules for each system implementation, said behavior rules including zero or more "structural rules" and zero or more "temporal rules"; wherein the temporal rules represent a linear sequence of one or more events identified in the captured traces; wherein each structural rule represents a constraint on a "field" of an event identified in the captured traces; comparing one or more rules of the set of rules for the first system implementation to corresponding rules of the second system implementation; and reporting any differences between any rules in the sets of rules for the different system implementations as potential compatibility bugs.

16. The computer-readable storage hardware device of claim 15 wherein comparing one or more of the set of rules for the first system implementation to corresponding rules of the second system implementation further comprises steps for performing a "rule checking" process, said rule checking process comprising: for each structural rule of one of the two system implementations, checking validity for corresponding events in the traces of the other system implementation and reporting any invalid rules as potential behavioral compatibility bugs; and creating one or more behavioral models using one or more temporal rules of one of the two system implementations and reporting events where any of the models does not accept a corresponding trace from the other system implementation as potential behavioral compatibility bugs.

17. The computer-readable storage hardware device of claim 15 wherein comparing one or more of the set of rules for the first system implementation to corresponding rules of the second system implementation further comprises steps for performing a "rule diffing" process, said rule diffing process comprising: calculating a set difference between the sets of rules for each system implementation and reporting differences in those sets as potential behavioral compatibility bugs; and for temporal rules satisfied by the traces of both system implementations, reporting as potential behavioral compatibility bugs: any significant change in statistical significance of rules, and any significant change in a time interval between witness events for any particular rules.

18. The computer-readable storage hardware device of claim 15 wherein the first and second system implementations are different implementations of the same class of hardware device.

19. The computer-readable storage hardware device of claim 15 wherein the first and second system implementations are different implementations of the same class of device driver software.

20. The computer-readable storage hardware device of claim 15 wherein the first and second system implementations are different implementations of the same software abstraction layer within an operating system.

* * * * *